United States Patent [19]

Smolko et al.

[11] 4,213,188
[45] Jul. 15, 1980

[54] APPARATUS FOR DETECTING AND CORRECTING ERRORS IN ARITHMETIC PROCESSING OF DATA REPRESENTED IN THE NUMERICAL SYSTEM OF RESIDUAL CLASSES

[76] Inventors: Gennady G. Smolko, 103536, korpus 501, kv. 19; Izrail Y. Akushsky, Volokolamskoe shosse, 1, kv. 119; Vladimir M. Burtsev, ulitsa 26 Bakinskikh Komissarov, 11, kv. 8, all of Moscow, U.S.S.R.

[21] Appl. No.: 937,930

[22] Filed: Aug. 30, 1978

[51] Int. Cl.² .................................................. G06F 11/10
[52] U.S. Cl. ...................................................... 364/739
[58] Field of Search .................................. 364/739, 746

[56] References Cited

U.S. PATENT DOCUMENTS

| | | | |
|---|---|---|---|
| 3,137,788 | 6/1964 | Froggatt | 364/739 |
| 3,602,704 | 8/1971 | Akushsky et al. | 364/739 |

FOREIGN PATENT DOCUMENTS

| | | | |
|---|---|---|---|
| 226278 | 9/1968 | U.S.S.R. | 364/739 |
| 398950 | 9/1973 | U.S.S.R. | 364/739 |

OTHER PUBLICATIONS

Mandelbaum, "Error Correction in Residue Arithmetic", *IEEE Trans. on Computers*, vol. C-21, No. 6, Jun. 1972, pp. 538–545.

Yau et al., "Error Correction in Redundant Residue Number Systems", *IEEE Trans. on Computers*, vol. C-22, No. 1, Jan. 1973, pp. 5–11.

*Primary Examiner*—David H. Malzahn
*Attorney, Agent, or Firm*—Fleit & Jacobson

[57] ABSTRACT

An apparatus for detecting and correcting errors in the arithmetic processing of data represented in the numerical system of residual classes comprises a register coupled to a residue calculator, a control unit coupled to a constant storage unit which connects an error syndrome calculator, a comparator coupled to an error syndrome calculator. A modulo adder is connected to the register and to the residue calculator whereas single and multiple error detectors are coupled to the register and to the residue calculator via a first group of AND gates and are also coupled to a group of OR gates and to an analyzing unit via a group of OR gates. The analyzing unit connects second and third groups of AND gates as well as a second output bus and a logic unit coupled to an adder which is connected to a first output bus. Coupled to the adder are a fourth group of AND gates, a control flip-flop and the register. The second group of AND gates is coupled to an OR gate and to the constant storage unit. The register and control flip-flop are coupled to input buses.

7 Claims, 5 Drawing Figures

APPARATUS FOR DETECTING AND CORRECTING ERRORS IN ARITHMETIC PROCESSING OF DATA REPRESENTED IN THE NUMERICAL SYSTEM OF RESIDUAL CLASSES

FIELD OF THE INVENTION

The invention relates to error detecting and monitoring devices, and more particularly to an apparatus for detecting and correcting errors occurred in the arithmetic processing of data represented in the numerical system of residual classes.

The instant invention is applicable for use in monitoring and correcting any errors which take place in the results obtained in the course of arithmetic operations performed by computers based on the numerical system of residual classes.

The present-day means and methods providing for noise-immune coding are mainly suitable for the transfer of data and make use of the fact that an assumption is made on the nature of errors (single, double, etc.).

If data is corrected in which an error occurs whose nature is determined improperly, then the error is not corrected but a new error is introduced as a result of such correction.

The code of the numerical system of residual classes is an arithmetic code. Thus, a highly reliable processor requires that an error correcting and monitoring apparatus be created which could be operated to correct any errors in the transfer or arithmetic processing of the data.

The invention provides for partial solving of the problem.

DESCRIPTION OF THE PRIOR ART

Known in the art is a device for detecting and correcting errors in the numerical system of residual classes (cf. the USSR Inventor's Certificate No. 398,950 Issued on Sept. 27, 1973, Int. Cl. G06 F11/00).

The described device operates on the principle of extending the source range of representation of numbers in the numerical system of residual classes. To simplify this extension process, use is made of the extension procedure with inaccurate rank. The latter procedure, as compared to the extension procedure with accurate rank, does not require the equipment of that type which can provide for the conversion of numbers from the numerical system of residual classes to a positional number system.

The device comprises an input register, whose input is coupled to an input bus, a first constant storage unit, whose input is coupled to the output of the input register, first and second inaccurate rank calculators having their inputs coupled, respectively, to the first and second outputs of the first constant storage unit, first and second check base adders having their first inputs coupled to the output of the first inaccurate rank calculator, having their second inputs coupled to the first output of the first constant storage unit, and having their third inputs coupled to the third output of the first constant storage unit, third and fourth check base adders having their first inputs coupled to the output of the second inaccurate rank calculator and having their second and third inputs coupled, respectively, to the second and fourth outputs of the first constant storage unit, a second constant storage unit and an analyzing unit having their inputs coupled to the first, second, third and fourth check base adders, the output of the second constant storage unit being coupled to a first output bus, and the output of the analyzing unit being coupled to a second output bus.

The described device is a sophisticated one since the location and magnitude of an error are determined by extending the range of representation of numbers, which requires the calculation of the magnitude of the inaccurate rank.

There is another device for detecting and correcting errors in the numerical system of residual classes (cf. the USSR Inventor's Certificate No. 226,278 issued on Sept. 5, 1968 Int. Cl. G06 F11/08).

This device comprises a register having its first input coupled to an input bus, an adder having its first and second inputs coupled to respective outputs of the register, an analyzing unit having its input coupled to the output of the adder and having its first and second outputs coupled, respectively, to first and second output buses, a single error detector having its input coupled to the third output of the analyzing unit, an error correcting unit having its input coupled to the output of the single error detector and having its output coupled to the second input of the register, a storage unit having its first input coupled to the first output of the register, having its second input coupled to the fourth output of the analyzing unit, and having its output coupled to the third input of the adder.

The described device cannot provide for the detection and correction of multiple errors. In addition, if a multiple error takes place, then the device, after sensing the error as a single one and correcting it in a formal way, tends to introduce a new error.

DESCRIPTION OF THE INVENTION

An object of the invention is to provide an apparatus for detecting and correcting errors on the numerical system of residual classes capable of detecting and correcting multiple errors in the results obtained in the arithmetic processing of data by computers.

There is disclosed an apparatus for detecting and correcting errors in the arithmetic processing of data represented in the numerical system of residual classes, wherein the result of each arithmetic operation is an operand under check (hereinafter called the check operand) comprised of the residues to the bases in the working range and of the real residue to a check base, said apparatus comprising a register to store the check operand having its input coupled to a first input bus; a constant storage unit to store the constants to be added algebraically to the check operand so that possible errors occurring in it are corrected and to store the binary digits which determine erroneous residues; an error correcting adder to provide the corrected operand by adding the check operand to the constant determined by an error in the check operand; a single error detector to discriminate the erroneous residue of the check operand and by multiple analysis of the binary digit found at a location in which an error is asumed to be in the check operand; an analyzing unit to signal the occurrence of errors in the check operand having its first output coupled to a first output bus, said apparatus being provided, according to the invention, with a residue calculator to calculate the residue of the check operand to the check base with which the check operand is provided to allow for the detection of errors in it, said residue calculator having its input coupled to the first output of the register; an error syndrome calculator having its input coupled to the first output of the constant storage unit; a modulo adder to calculate the syndrome of the check operand by algebraically adding the real residue to the check operand and the calculated residue to the check base of the check operand, said modulo adder having its first input coupled to the output of the residue calculator and having its second input coupled to the second output of the register; a comparator responsive to the representations of the error syndrome and the syndrome of the check operand to determine whether or not an error takes place in the latter, said comparator having its first input coupled to the output of the modulo adder and having its second input coupled to the output of the error syndrome calculator; k multiple error detectors to discriminate the erroneous residues of the check operand by multiple analysis of the binary digit found at locations in which errors are assumed to be in the check operand depending on the error syndromes, the inputs of said k multiple error detectors being combined with an input of the single error detector and being coupled, via a first group of AND gates, to the output of the comparator, and the first and second outputs of the single error detector and of the k multiple error detectors being coupled to respective inputs of the analyzing unit; a logic unit which is activated after the locations of the errors in the check operand have been established and allows for the application of the check operand to the error correcting adder, said logic unit having its two inputs coupled to the outputs of the register, having its third input coupled to the first output of the analyzing unit, having its fourth input coupled to the second output of the analyzing unit, and having its output coupled to the first input of the error correcting adder; a control flip-flop to select the operating modes of the apparatus, said control flip-flop having its input coupled to a second input bus and having its output coupled to the fifth input of the logic unit; a control unit to control the operation of the means responsible for the correction of the erroneous check operand, the output of the control unit being coupled to the first input of the constant storage unit and to the first group of AND gates which is connected to the second output of the constant storage unit; a group of OR gates having its inputs coupled to the third outputs of the single error detector and of the k multiple error detectors, and having its output coupled, via a second group of AND gates, to the second input of the constant storage unit which has its third input coupled to the output of a third group of AND gates which has its first input coupled to the output of the modulo adder and has its second input coupled to the second output of the analyzing unit; a fourth group of AND gates having its first input coupled to the first output of the constant storage unit, having its second input coupled to the second output of the analyzing unit, which is coupled to the second input of the second group of AND gates, and having its output coupled to the second input of the error correcting adder whose output is coupled to a second output bus.

Advantageously, each multiple error detector comprises AND gates having their first inputs coupled to the output of the first group of AND gates and having their true and complement outputs coupled to the inputs of flip-flops which have their outputs coupled to the second inputs of respective AND gates, to respective inputs of the group of OR gates and to the inputs of an adder which has its output coupled, via first and second comparison circuits, to respective inputs of the analyzing unit.

Preferably, the analyzing unit comprises adders, the input of the first one of these adders being coupled to the second output of the single error detector, the inputs of the subsequent adders being coupled to the second outputs of respective multiple error detectors, the outputs of the adders being coupled, via AND gates, to the inputs of an OR gate whose output is coupled to the fourth input of the logic unit which has its third input coupled to the output of a group of AND gates having its inputs coupled to the first outputs of the single and multiple error detectors.

It is advantageous that the logic unit comprises three groups of AND gates having their outputs coupled to the inputs of an OR gate which has its output coupled to the first input of the error correcting adder, the complement input of the first one of the three groups of AND gates being coupled to the output of the control flip-flop, the second input of the first group of AND gates being coupled to the last input of the third group of AND gates and to the second output of the analyzing unit, the third input of the first group of AND gates being combined with the first input of the second group of AND gates and with the second input of the third group of AND gates and being coupled to the first output of the register, the fourth input of the first group of AND gates being combined with the second input of the second group of AND gates and with the first input of the third group of AND gates and being coupled to the second input of the register, and the complement input of the second group of AND gates being coupled to the first output of the analyzing unit.

The instant invention makes it possible to detect and correct errors in the transfer or processing of data so that their character is not previously determined.

With the invention used in data processing and transfer systems, the hardware components require lower reliability since the validity of the computation results is provided to the fullest extent according to the invention.

DESCRIPTION OF THE DRAWINGS

The invention will now be described, by way of example, with reference to the accompanying drawings in which.

DESCRIPTION OF THE INVENTION

Figure 1:
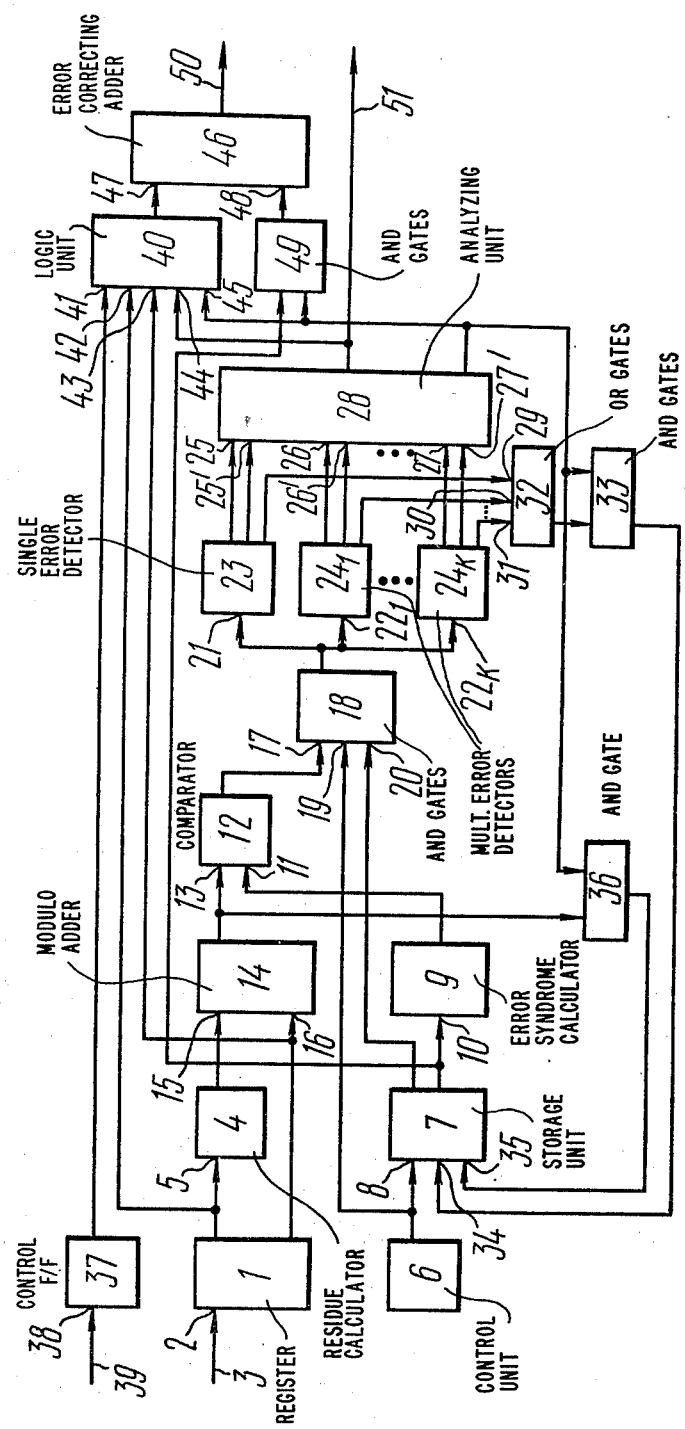
FIG. 1 is a block diagram of an apparatus for detecting and correcting errors in arithmetic processing of data represented in the numerical system of residual classes, according to the invention.

The apparatus for detecting and correcting errors in the arithmetic processing of data represented in the numerical system of residual classes according to the invention comprises a register 1 (FIG. 1) having its input 2 coupled to an input bus 3, a residue calculator 4 whose input 5 is coupled to the output of the register 1, a control unit 6, and a constant storage unit 7. An input 8 of the constant storage unit 7 is coupled to the output of the control unit 6.

The apparatus comprises an error syndrome calculator 9 whose input 10 is coupled to the output of the constant storage unit 7 and whose output is coupled to an input 11 of a comparator 12. An input 13 of the comparator 12 is coupled to the output of a modulo adder 14. An input 15 of the modulo adder 14 is coupled to the output of the residue calculator 4, whereas an input 16 of the modulo adder 14 is coupled to the output of the register 1. The outpt of the comparator 12 is coupled to an input 17 of a group 18 of AND gates which has its inputs 19, 20 coupled, respectively, to the output of the control unit 6 and to the output of the constant storage unit 7. The output of the group of AND gates 18 is coupled to combined inputs 21, 22$_1$, . . . , 22$_k$ of a single error detector 23 and of multiple error detectors 24$_1$, . . . , 24$_k$, respectively. First and second outputs of the single error detector 23 and of the multiple error detectors 24$_1$, . . . , 24$_k$ are coupled to inputs 25, 25′, 26, 26′,27, 27′ of an analyzing unit 28. Third outputs of the single error detector 23 and of the multiple error detectors 24$_1$, . . . , 24$_k$ are coupled to inputs 29, 30, 31 of a group 32 of OR gates which has its output coupled, via a group 33 of AND gates, to an input 34 of the constant storage unit 7 whose input 35 is coupled, via a group 36 of AND gates, to the output of the analyzing unit 28 to which the group 33 of AND gates is also connected. The input of the group 36 of AND gates is coupled to the modulo adder 14.

The apparatus further comprises a control flip-flop 37 whose input 38 connects an input bus 39; a logic unit 40 having its inputs 41, 42, 43, 44, 45 coupled, respectively, to the output of the control flip-flop 37, to the outputs of the register 1 and to the outputs of the analyzing unit 28; and an error correcting adder 46 having its input 47 coupled to the output of the logic unit 40 and having its input 48 coupled, via a group 49 of AND gates, to the output of the constant storage unit 7. The output of the error correcting adder 46 is coupled to an output bus 50. Coupled to an output bus 51 is the first output of the analyzing unit 28 which has its second output coupled to the group 49 of AND gates.

Each of the multiple error detectors 24$_1$, . . . , 24$_k$ and the single error detector 23 as well comprises AND gates 52$_1$, 52$_2$, . . . , 52$_m$ (FIG. 2) which have their inputs 53$_1$, 53$_2$, . . . , 53$_m$ coupled to the output of the group 18 of AND gates (FIG. 1). True and complement outputs of the AND gates 52$_1$, 52$_2$, . . . , 52$_m$ are coupled to the inputs of flip-flops 54$_1$, 54$_2$, . . . , 54$_m$ which have their outputs coupled to respective inputs 55$_1$, 55$_2$, . . . , 55$_m$ of the AND gates 52$_1$, 52$_2$ . . . 52$_m$, to the inputs 29, 30, 31 (FIG. 1) of the group 32 of OR gates and to the inputs of an adder 56 (FIG. 2) which has its output coupled, via comparison circuits 57, 58, to inputs 25, 25′, 26, 26′ or 27, 27′ (FIG. 1) of the analyzing unit 28.

Figure 3:
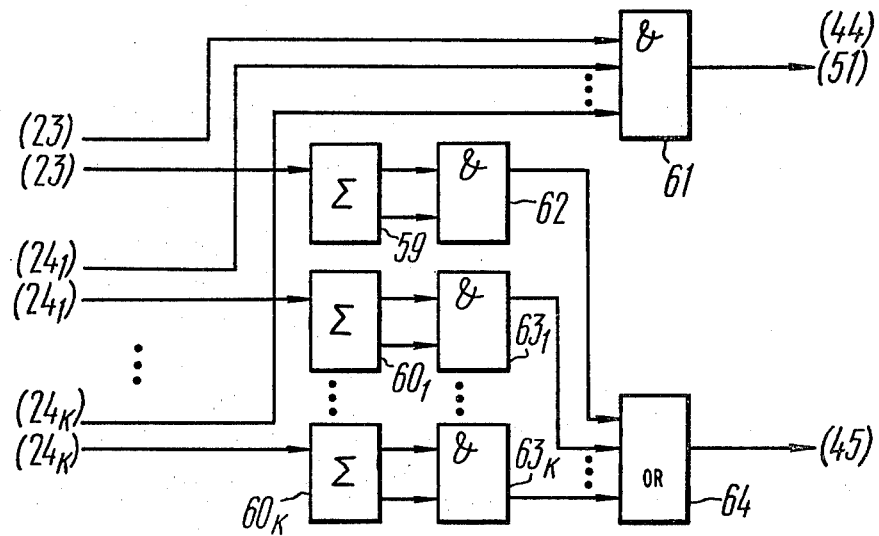
FIG. 3 is a block diagram of the analyzing unit, according to the invention.

The analyzing unit 28 comprises adders 59 (FIG. 3), 60$_1$, . . . , 60$_k$, the input of the adder 59 being coupled to the second output of the single error detector 23 (FIG. 1) and to the first input of a group 61 of AND gates (FIG. 3). The inputs of the adders 60$_1$, . . . , 60$_k$ are coupled to the second outputs of respective multiple error detectors and to the remaining inputs of the group 61 of AND gates (FIG. 3).

The outputs of the adders 59,60$_1$, . . . , 60$_k$ are coupled, via AND gates 62, 63$_1$, . . . , 63$_k$, to the inputs of an OR gate 64 whose output is coupled to the input 45 (FIG. 1) of the logic unit 40 having its input 44 coupled to the output of the group 61 of AND gates (FIG. 3).

The logic unit 40 comprises three groups 65 (FIG. 4), 66, 67 of AND gates, which have their outputs coupled to the inputs of an OR gate 68 having its output coupled to the input 47 (FIG. 1) of the error correcting adder 46.

The complement input of the group 65 (FIG. 4) of AND gates is coupled to the output of the control flip-flop 37 (FIG. 1). An input 69 (FIG. 4) of the group 65 is coupled to an input 70 of the group 67 and to the second output of the analyzing unit 28 (FIG. 1). An input 71 (FIG. 4) of the group 65 is combined with an input 72 of the group 66 and with an input 73 of the group 67 and is coupled to the first output of the register 1 (FIG. 1). An input 74 (FIG. 4) of the group 65 is combined with an input 75 of the group 66 and with an input 76 of the group 67 and is coupled to the second output of the register 1 (FIG. 1). The complement input of the group 66 (FIG. 4) is coupled to the first output of the analyzing unit 28 (FIG. 1).

Figure 5:
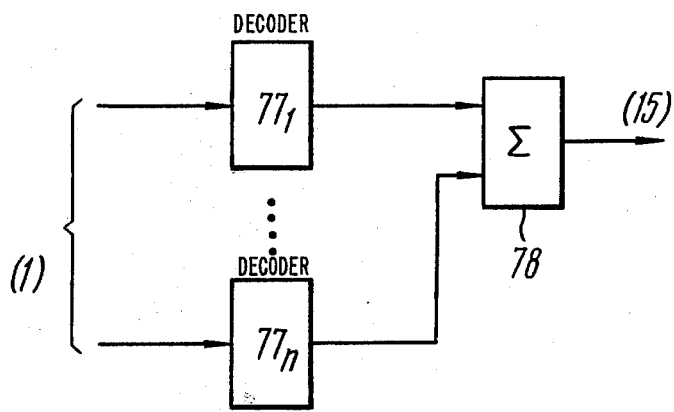
FIG. 5 is a block diagram of the residue calculator, according to the invention.

The residue calculator 4 (FIG. 1) comprises decoders 77$_1$, . . . , 77$_n$ (FIG. 5) whose outputs are coupled to the inputs of a modulo adder 78. The output of the modulo adder 78 is coupled to the input 15 (FIG. 1) of the modulo adder 14. The inputs of the decoders 77$_1$, . . . , 77$_n$ (FIG. 5) are coupled to the first output of the register 1 (FIG. 1).

The apparatus of the invention operates in the following manner. Applied to the input bus 3 (FIG. 1) is the operand A under check (hereinafter called the check operand A) which is represented in the numerical system of residual classes as follows $$A = (\alpha_1, \alpha_2, \ldots \alpha_i, \ldots, \alpha_n, \alpha_{n+1}) \tag{1}$$

where $\alpha_i$ is the residue of the check operand A to the modulo $p_i$ $$\alpha_i \equiv A \bmod p_i \; i = 1, 2, \ldots, n+1$$

$p_1, p_2, \ldots, p_i, \ldots, p_n$ are the bases of the numerical system of residual classes in the working range;

$p_{n+1}$ is the check base of the numerical system of residual classes.

The check operand A is stored in the register 1. The part $A' = (\alpha_1, \alpha_2, \ldots \alpha_i, \ldots, \alpha_n)$ of the check operand A is delivered from the output of the register 1 to the input 5 of the residue calculator 4 in which the calculated residue of the check operand A to the check base $p_{n+1}$ is determined by $$\alpha_{n+1}^1 = \sum_{i=1}^{n} \lambda_i \alpha_i \bmod p_{n+1} \tag{2}$$

where $\lambda_i$ ($i = 1, 2, \ldots, n$) is a predetermined constant.

The calculated residue $\alpha_{n+1}'$, available from the output of the residue calculator 4, and the real residue $\alpha_{n+1}$, from the second output of the register 1, of the check operand A are applied, respectively, to the inputs 15 and 16 of the modulo adder 14 whose output produces the syndrome of the check operand A as follows:

$$\delta_A \equiv \alpha_{n+1}' - \alpha_{n+1} \bmod p_{n+1} \tag{3}$$

The value of the syndrome $\delta_A$ of the check operand A is compared, in the comparator 12, with the value of the error syndrome $\delta_\Delta$ which is calculated in a manner described below.

The following trains of signals can be delivered from the output of the control unit 6 to the input 8 of the constant storage unit 7:

a first train of signals according to which the first output of the constant storage unit 7 provides the values $\Delta_i$ of the errors which may occur in a residue of the check operand A, where $\Delta$ is the value of the error and i is the no. of the erroneous residue $\alpha_i$ (i=1,2, ..., n);

a second train of signals according to which the first output of the constant storage unit 7 provides the values $(\Delta_i, \Delta_j)$ of the errors which may occur in two residues of the check operand A, where $i \neq j$ and $i,j=1,2, ..., n$;

the last (nth) train of signals according to which the first output of the constant storage unit 7 produces the values $(\Delta_1, \Delta_2, ..., \Delta_i, ..., \Delta_n)$ of the errors which may occur in all the n residues of the check operand A.

The values of the errors are delivered from the first output of the constant storage unit 7 to the input 10 of the error syndrome calculator 9 whose output produces the error syndrome $\delta_\Delta$ as follows $$\delta_\Delta = \sum_{i=1}^{n} \lambda_i \Delta_i \bmod p_{n+1} \qquad (4)$$

The value of the error syndrome $\delta_\Delta$ is compared, in the comparator 12, with the value of the syndrome $\delta_A$ of the check operand A.

If the syndrome of the check operand A is equal to the error syndrome, i.e., $\delta_A = \delta_\Delta$, then an error may take place in the check operand A with the error syndrome $\delta_\Delta$. In this case, the binary digit $X = x_1, x_2, ..., x_i, ..., x_n$ in which $x_i (i=1,2, ..., n)$ can assume one of the values $\{0,1\}$ is delivered from the second output of the constant storage unit 7 to the input 20 of the group 18 of AND gates. The value of $x_i$ is selected to be equal to b 1 when an error may take place in the residue $\alpha_i$ of the check operand A and is selected to be equal to 0 when no error may take place in the residue $\alpha_i$ of the operand A. The locations in which the binary digit X is stored are determined by the number of digits $x_i \neq 0$ contained in it as follows:

when $$\sum_{i=1}^{n} x_i = 1,$$

the binary digit X is stored in the single error detector 23;

when $$\sum_{i=1}^{n} x_i = 2,$$

the binary digit X is stored in the multiple error detector $24_1$ and so on;

when $$\sum_{i=1}^{n} x_i = n,$$

the binary digit X is stored in the multiple error detector $24_k$ ($k=n-1$).

If the error syndrome $\delta_\Delta$ and the syndrome $\delta_A$ of the check operand A do not compare, i.e., $\delta_\Delta \neq \delta_A$, then the group 18 of AND gates is rendered non-conductive and another possible error in the check operand A is delivered from the constant storage unit 7.

The condition in which the binary digit X appears at the input of the single error detector 23 or at the input of any one of the multiple error detectors $24_1, ..., 24_k$ is remembered in the analyzing unit 28. If only one detector, either single error or multiple error, among those labelled 23, $24_1, ..., 24_k$, is found to hold the binary digit X with $x_i \neq 0$ (i=1,2, ..., n) during a given operational cycle of the apparatus and if such an event occurs several times, for example, in the case of three check operands delivered anew, then the error is assumed to be detected; under these conditions, logic 1 is available on the second output of the analyzing unit 28. That logic 1 causes the binary digit X indicating the erroneous residues of the check operand A to pass, via the group 32 of OR gates and the group 33 of AND gates, to the input 34 of the constant storage unit 7.

The same logic 1 also causes the syndrome $\delta_A$ of the check operand A to pass from the output of the modulo adder 14 to the input 35 of the constant storage unit 7 via the group 36 of AND gates.

In this case, delivered from the first output of the constant storage unit 7, via the group 49 of AND gates, to the input 48 of the error correcting adder 46 is the error value as follows:

$$\Delta = \bar{\Delta}_1, \bar{\Delta}_2, ..., \bar{\Delta}_i, ... \bar{\Delta}_n \qquad (5)$$

The check operand A is delivered to the input 47 of the error correcting adder 46, via the logic unit 40, from the outputs of the register 1.

The error value determined by the constants held in the constant storage unit 7 is subtracted from the check operand A with the help of the error correcting adder 46 and the error that has taken place in the check operand A is thus eliminated.

The corrected check operand A is passed to the output bus 50 from the output of the error correcting adder 46.

If the single error detector 23 as well as some of the multiple error detectors $24_1, ..., 24_k$ store the binary digit X with $x_i \neq 0$ (i=1, ..., n) during a given operational cycle of the apparatus (which condition is achnowledged by the application of logic 1's to the inputs of the analyzing unit 28), then the first output of the analyzing unit 28 provides logic 1 and the apparatus starts handing a new check operand A.

If none of the detectors 23, $24_1, ..., 24_k$ is found to hold the binary digit X with $x_i \neq 0$ (i=1,2 ..., n) during a given operational cycle of the apparatus, this means that the check operand A has no errors. Now, the first output of the analyzing unit 28 produces logic 0 which causes the check operand A to pass from the register 1 to the output bus 50 via the logic unit 40 and the error correcting adder 46.

Th apparatus of the invention operates in the described manner when the monitored processor is maintained operative so that the latter provides the former with the current value of the check operand A, delivered via the input but 3, and with a control signal (logic 1) which applied, via the input bus 39, to the input 38 of the control flip-flop 37 which therefore takes up the 1 state.

A situation may occur in which the computation process in the monitored processor is terminated but an error is left in the check operand A. Under these conditions, logic 1 is placed on the output bus 51 and the control flip-flop 37 takes up the 0 state so that logic 0 from the input bus 39 is present on its output. In this case, the check operand A is delivered, via the logic unit 40, from the register 1 to the error correcting adder 46 in which it is stored until the error is detected and corrected, which is manifested by the appearance of logic 0 on the output bus 51.

Described below is the operation of the multiple error detector $24_i$ (FIG. 1) for which $i=1,2,\ldots,k$ and $k=n-1$.

Figure 2:
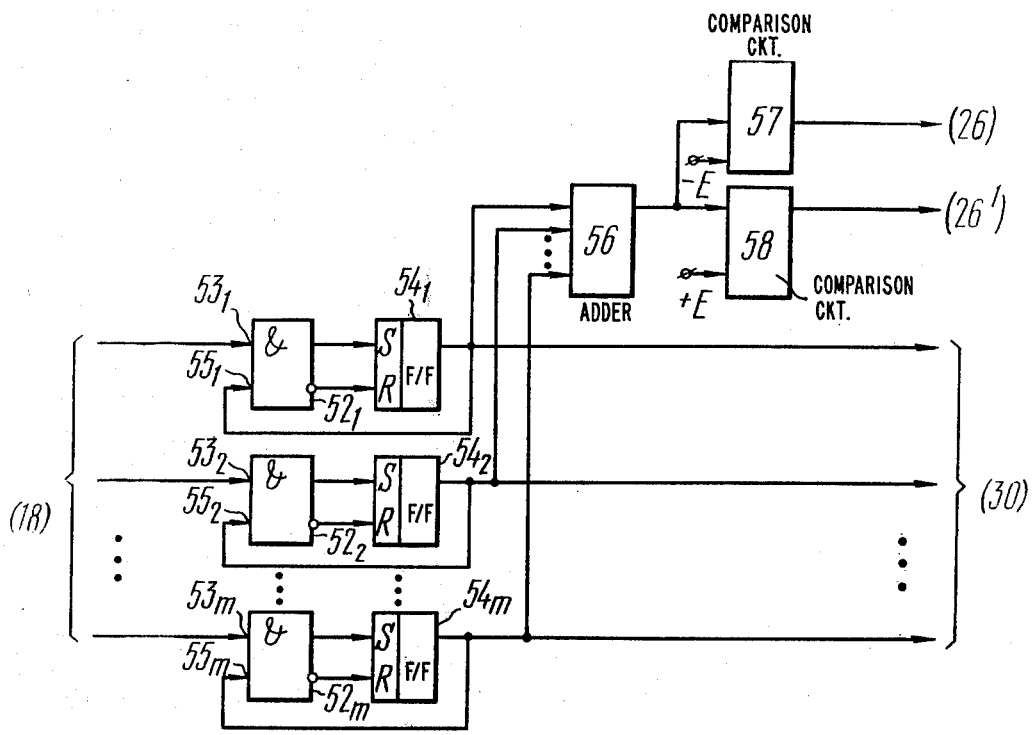
FIG. 2 is a block diagram of the multiple error detector, according to the invention.

Before the multiple error detector $24_i$ is put in operation, the flip-flops $54_1, 54_2, \ldots, 54_m$ (FIG. 2) assume the 1 state with the help of a setting bus (not shown in FIG. 2).

We have $$m = C_n^{i+1} = \frac{n \cdot (n-1) \ldots (n-i)}{(i+1)i \cdot (i-1) \ldots 1} \quad (6)$$

The binary digit $X = x_1, x_2, \ldots, x_m$ is applied to the input $22_i$ of the multiple error detector $24_i$ and the value of $x_j$ in this case may be 1 or 0 ($j=1,2,\ldots,m$).

When $x_j=1$, logic 1 obtainable from the true output of the AND gate $54_j$ is delivered to the set input of the flip-flop $54_j$ if the latter is maintained in the 1 state, and is not delivered to the set input of the flip-flop $54_j$ if the latter is maintained in the 0 state.

When $x_j=0$, logic 1 from the complement output of the AND gate $52_j$ is delivered to the reset input of the flip-flop $54_j$ irrespective of the state of the latter.

The signals from the outputs of the flip-flops $54_1, 54_2, \ldots, 54_m$ are applied to the inputs of the adder 56. In this case, the addition result equal to 0 is accepted by the first comparison circuit 57 whereas the addition result equal to 1 is accepted by the second comparison circuit 58.

The condition in which the addition result compares with 0 indicates that there are no errors of the given type in the check operand A.

The condition in which the addition result compares with 1 indicates that the erroneous residues of the check operand A are found which can be manifested by logic 1's obtainable from the outputs of the flip-flops $54_1, 54_2, \ldots, 54_m$ and present on the third output of the multiple error detector $24_i$.

The analyzing unit 28 (FIG. 3) operates as follows.

The signals from the first outputs of the single error detector 23 and of the multiple error detectors $24_i, \ldots, 24_k$ are fed to the input of the AND gate 61 (FIG. 3) the complement output of which produces logic 0 to indicate that there are no errors in the check operand A.

The signals from the second outputs of the single error detector 23 (FIG. 1) and of the multiple error detectors $24_1, \ldots 24_k$ are applied to respective adders 59, $60_1, \ldots, 60_k$ (FIG. 3) each of which is a two-digit accumulating adder having its bit positions provided with outputs.

The signals applied to the adders $59, 60_1, 60_k$ are subjected to the process of addition. When the addition results each equal to three are obtained they are received by respective AND gates $62, 63_1, \ldots, 63_k$ and the second output of the analyzing unit 28 (FIG. 1) receives logic 1 passed via the OR gate 64.

The logic unit 40 operates as follows.

Figure 4:
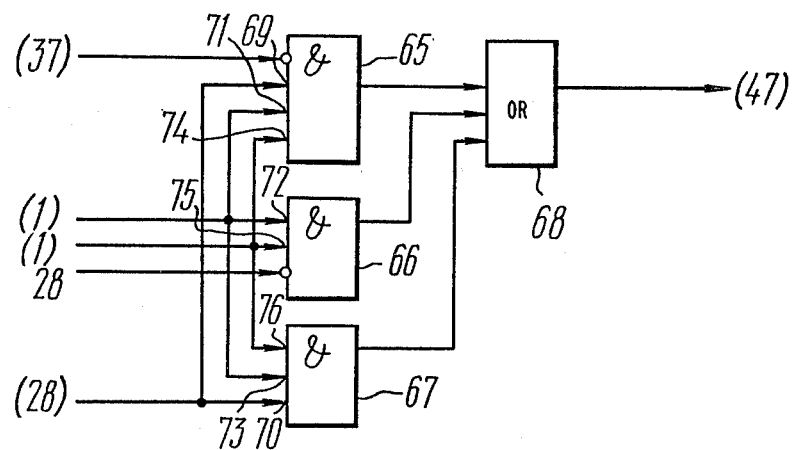
FIG. 4 is a block diagram of the logic unit, according to the invention.

The output of the group 68 of OR gates (FIG. 4) produces the check operand A under the following conditions:

an error is found in the check operand A; in this case, a signal applied to the input 70 of the group 67 of AND gates enables the passage of the check operand A, from the outputs of the register 1 (FIG. 1) to the output of the logic unit 40 (FIG. 4);

there is no error in the check operand A; in this case, a signal applied to the complement input of the group of AND gates 66 enables the passage of the check operand A from the outputs of the register 1 (FIG. 1) to the output of the logic unit 40;

there is an error in the check operand A, but the computation process in the monitored processor has finished; in this case, a signal applied to the complement input of the group 65 of AND gates (FIG. 4) from the output of the control flip-flop 37 (FIG. 1) enables the check operand A to pass from the outputs of the register 1 to the output of the logic unit 40.

The residue calculator 4 operates in the following manner.

The check operand A obtainable from the first output of the register 1 is applied to the input 5 of the residue calculator 4. The residues $\alpha_1, \alpha_2, \ldots, \alpha_i, \ldots, \alpha_n$ of the check operand A to the bases of the working range are applied, respectively, to the decoders $77_1, \ldots, 77_i, \ldots, 77_n$ (FIG. 5) and the outputs of the latter provide the values as follows $$q_i = \eta_i \alpha_i \bmod p_{n+1} \quad (7)$$

where $i=1,2,\ldots,n$ and $\eta_1, \eta_2, \ldots, \eta_n$ are predetermined constants.

The values of $q_i$ from the outputs of the decoders $77_1, \ldots, 77_n$ are applied to the inputs of the modulo adder 78 and the value of the calculated residue of the check operand A to the check base is produced at the output of the modulo adder 78.

The calculated residue of the check operand A to the check base is given by $$\alpha_{n+1}^1 = \sum_{i=1}^{n} q_i \bmod p_{n+1} \quad (8)$$

or $$\alpha_{n+1}^1 = \sum_{i=1}^{n} \eta_i \alpha_i \bmod p_{n+1} \quad (9)$$

The invention provides for the detection and correction of errors in the transfer or processing of data and does not require that assumption be made on the character of the errors.

With the invention used in data processing and transfer systems, the hardware components require lower reliability since the validity of the computation results is provided to the fullest extent according to the invention.

What is claimed is:

1. An apparatus for detecting and correcting errors in the arithmetic processing of data represented in the numerical system of residual classes, wherein the result of each arithmetic operation is an operand under check (hereinafter called the check operand) comprised of the residues to the bases in the working range and of the real residue to a check base, said apparatus comprising:
first and second input buses;
a register to store said check operand having an input and outputs, said input being coupled to said first input bus;
a constant storage unit to store the constants to be added algebraically to said check operand so that possible errors occurring in it are corrected and to store the binary digits which determine erroneous residues, said constant storage unit having inputs and outputs;

an error correcting adder to provide the corrected operand by adding said check operand to the constant determined by an error in the check operand, said error correcting adder having inputs and an output;

a single error detector to discriminate the erroneous residue of the check operand by multiple analysis of the binary digit found at a location in which an error is assumed to be in the check operand, said single error detector having an input and outputs;

an analyzing unit to signal the occurrence of errors in the check operand, said analyzing unit having inputs and outputs, said first one of said outputs being coupled to a first output bus;

said apparatus further comprising:

a residue calculator to calculate the residue of the check operand to the check base with which the check operand is provided to allow for the detection of errors in it; an input and an output of said residue calculator, said input being coupled to said first output of said register;

an error syndrome calculator; an input and an output of said error syndrome calculator, said input being coupled to said first output of said constant storage unit;

a modulo adder to calculate the syndrome of the check operand by algebraically adding the real residue to the check base and the calculated residue to the check base of the check operand; inputs and an output of said modulo adder, said first one of said inputs being coupled to said output of said residue calculator, and said second input being coupled to said second output of said register;

a comparator responsive to the representations of the error syndrome and the syndrome of the check operand to determine whether or not an error takes place in the latter; inputs and an output of said comparator, said first one of said inputs being coupled to said outputs of said modulo adder, and said second input being coupled to said output of said error syndrome calculator;

first, second and third groups of AND gates each provided with inputs and an output;

a group of OR gates; inputs and and output of said group of OR gates;

k multiple error detectors to discriminate the erroneous residues of the check operand by multiple analysis of the binary digit found at the locations in which errors are assumed to be in the check operand depending on the error syndromes; an input and outputs of each of said multiple error detectors, said inputs being coupled with said input of said single error detector and coupled, via said first group of AND gates, to said output of said comparator, said first and second outputs of said single error detector and of said k multiple error detectors coupled to said inputs of said analyzing unit; said inputs of said group of OR gates coupled to said third outputs of said analyzing unit; said output of said group of OR gates coupled to said second input of said constant storage unit via said second group of AND gates;

a logic unit which is activated after the locations of the errors in the check operand have been established and allows the application of the check operand to said error correcting adder; inputs and an output of said logic unit; said first and second ones of said inputs coupled to said outputs of said register; said third and fourth inputs coupled to said first and second outputs of said analyzing unit; and said output coupled to said first input of said error correcting adder;

a control flip-flop to select the operating modes of the apparatus; an input and an output of said control flip-flop; said input coupled to said second input bus; said output coupled to said fifth input of said logic unit;

a control unit to control the operation of the means responsible for the correction of the erroneous operand; an output of said control unit; said output coupled to said first input of said constant storage unit and to said second input of said first group of AND gates; said third input of said first group of AND gates coupled to said second output of said constant storage unit; said third input of said constant storage unit coupled to said output of said third group of AND gates; said first input of said third group of AND gates coupled to said output of said modulo adder; said second input of said third group of AND gates coupled to said second output of said analyzing unit;

a fourth group of AND gates; inputs and an output of said fourth group of AND gates; said first input coupled to said output of said constant storage unit; said second input coupled to said second output of said analyzing unit; said output coupled to said second input of said error correcting adder; and said output of said error correcting adder coupled to a second output bus.

2. An apparatus as claimed in claim 1, wherein each multiple error detector comprises k AND gates; inputs, true and complement outputs of each of said AND gates; said first inputs of said AND gates coupled to said output of said first group of AND gates;

k flip-flops; inputs and an output of each of said k flipflops, said first inputs of said k flip-flops coupled to said true outputs of said AND gates; said second inputs of said k flip-flops coupled to said complement outputs of said AND gates; said outputs of said k flip-flops coupled to said second inputs of said AND gates and to said input of said group of OR gates;

an adder; inputs and an output of said adder; first and second comparison circuits; inputs and outputs of said comparison circuits; said outputs of said first and second comparison circuits coupled to said inputs of said analyzing unit, and said inputs of said first and second comparison circuits coupled to said output of said adder;

said inputs of said adder coupled to said outputs of said flip-flops.

3. An apparatus as claimed in claim 2, wherein the analyzing unit comprises k adders; an input and outputs of each of said k adders:

said input of said first adder coupled to said second output of said single error detector;

said inputs of said subsequent adders coupled to said second outputs of said k multiple error detectors;

k AND gates; inputs and an output of each of said k AND gates; said inputs of said k AND gates coupled to said outputs of k adders; an OR gate; inputs and an output of said OR gate;

a group of AND gates; inputs and an output of said group of AND gates;

said inputs of said group of AND gates coupled to said first outputs of said single and multiple error detectors;

said output of said group of AND gates coupled tto said first output bus and to said third input of said logic unit;

said inputs of said OR gate coupled to said outputs of said AND gates; said output of said OR gate coupled to said fourth input of said logic unit.

4. An apparatus as claimed in claim 2, wherein the logic unit comprises three groups of AND gates; inputs and an output of each of said three groups of AND gates; a complement input of said first input of said first group of AND gates;

an OR gate; inputs and an output of said OR gate; said output coupled to said first input of said error correcting adder; said inputs coupled to said outputs of said groups of AND gates;

said complement input of said first group of AND gates coupled to said output of said control flip-flop;

said second input of said first group of AND gates combined with said last input of said third group of AND gates and coupled to said second output of said analyzing unit;

said third input of said first group of AND gates combined with said first input of said second group of AND gates and with said second input of said third group of AND gates and coupled to said first output of said register;

said fourth input of said first group of AND gates combined with said second input of said second group of AND gates and with said first input of said third group of AND gates and coupled to said second output of said register; said complement input of said second group of AND gates coupled to said first output of said analyzing unit.

5. An apparatus as claimed in claim 1, wherein the analyzing unit comprises k adders; an input and outputs of each of said k adders;

said input of said first adder coupled to said second output of said single error detector;

said inputs of said subsequent adders coupled to said second outputs of said k multiple error detectors;

k AND gates; inputs and an output of each of said k AND gates; said inputs of said k AND gates coupled to said outputs of said k adders;

an OR gate; inputs and an output of said OR gate;

a group of AND gates; inputs and an output of said group of AND gates;

said inputs of said group of AND gates coupled to said first outputs of said single and multiple error detectors;

said output of said group of AND gates coupled to said first output bus and to said third input of said logic unit.

6. An apparatus as claimed in claim 5, wherein the logic unit comprises three groups of AND gates; inputs and an output of each of said three groups of AND gates; a complement input of said first input of said first group of AND gates;

an OR gate; inputs and an output of said OR gate; said output of coupled to said first input of said error correcting adder; said inputs coupled to said outputs of said groups of AND gates;

said complement input of said first group of AND gates coupled to said output of said control flip-flop;

said second input of said first group of AND gates combined with the last input of said third group of AND gates and coupled to said second output of said analyzing unit;

said third input of said first group of AND gates combined with said first input of said second group of AND gates and with said second input of said third group of AND gates and coupled to said first output of said register;

said fourth input of said first group of AND gates combined with said second input of said second group of AND gates and with said first input of said third group of AND gates and coupled to said second output of said register;

said complement input of said second group of AND gates coupled to said first output of said analyzing unit.

7. An apparatus as claimed in claim 1, wherein the logic unit comprises three groups of AND gates; inputs and an output of each of said three groups of AND gates; a complement input of said first input of said first group of AND gates;

an OR gate; inputs and an output of said OR gate; said output coupled to said first input of said error correcting adder; said inputs coupled to said outputs of said groups of AND gates;

said complement input of said first group of AND gates coupled to said output of said control flip-flop;

said second input of said first group of AND gates combined with said last input of said third group of AND gates and coupled to said second output of said analyzing unit;

said third input of said first group of AND gates combined with said first input of said second group of AND gates and with said second input of said third group of AND gates and coupled to said first output of said register;

said fourth input of said first group of AND gates combined with said second input of said second group of AND gates and with said first input of said third group of AND gates and coupled to said second output of said register;

said complement input of said second group of AND gates coupled to said first output of said analyzing unit.

* * * * *